(12) United States Patent
Papasakellariou et al.

(10) Patent No.: US 9,357,532 B2
(45) Date of Patent: *May 31, 2016

(54) TRANSMISSION OF ACKNOWLEDGEMENT SIGNALS FROM A USER EQUIPMENT FOR ORTHOGONAL RECEPTION AT MULTIPLE POINTS

(71) Applicant: Samsung Electronics Co., Ltd., Gyeonggi-do (KR)

(72) Inventors: Aris Papasakellariou, Houston, TX (US); Young-Bum Kim, Seoul (KR); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/693,577

(22) Filed: Apr. 22, 2015

(65) Prior Publication Data

US 2015/0230229 A1    Aug. 13, 2015

Related U.S. Application Data

(63) Continuation of application No. 13/630,802, filed on Sep. 28, 2012, now Pat. No. 9,042,319.

(60) Provisional application No. 61/541,441, filed on Sep. 30, 2011, provisional application No. 61/656,729, filed on Jun. 7, 2012.

(51) Int. Cl.
*H04W 72/04* (2009.01)
*H04L 1/18* (2006.01)

(52) U.S. Cl.
CPC ......... *H04W 72/0406* (2013.01); *H04L 1/1854* (2013.01); *H04L 1/1861* (2013.01); *H04L 1/1864* (2013.01)

(58) Field of Classification Search
CPC .................................................... H04L 1/1854
See application file for complete search history.

(56) References Cited

U.S. PATENT DOCUMENTS

| 9,042,319 | B2* | 5/2015 | Papasakellariou et al. ... 370/329 |
| 2008/0205348 | A1 | 8/2008 | Malladi |
| 2011/0032884 | A1 | 2/2011 | Yu et al. |
| 2011/0126071 | A1 | 5/2011 | Han et al. |
| 2011/0128883 | A1 | 6/2011 | Chung et al. |
| 2011/0250918 | A1* | 10/2011 | Jen .................. 455/509 |
| 2012/0008586 | A1 | 1/2012 | Kwon et al. |
| 2013/0010724 | A1 | 1/2013 | Han et al. |

FOREIGN PATENT DOCUMENTS

KR     1020110093794    8/2011

* cited by examiner

*Primary Examiner* — John Blanton
(74) *Attorney, Agent, or Firm* — The Farell Law Firm, P.C.

(57) ABSTRACT

Methods and user equipment (UE) apparatuses are provided to transmit a control signal using a first sequence or a second sequence, in response to a detected control channel. A method includes determining a first resource for the control signal transmission from a sum of a lowest control channel element (CCE) index of the detected control channel and a first offset, if the UE is not configured to use the second sequence by higher layer signaling; determining a second resource for the control signal transmission from a sum of the lowest CCE index of the detected control channel and a second offset, if the UE is configured to use the second sequence by the higher layer signaling; and transmitting the control signal in the first resource or in the second resource.

18 Claims, 9 Drawing Sheets

TRANSMISSION OF ACKNOWLEDGEMENT SIGNALS FROM A USER EQUIPMENT FOR ORTHOGONAL RECEPTION AT MULTIPLE POINTS

PRIORITY

This application is a Continuation of U.S. Ser. No. 13/630,802, which was filed in the United States Patent and Trademark Office (USPTO) on Sep. 28, 2012, and claims priority under 35 U.S.C. §119(e) to United States Provisional Applications filed in the USPTO on Sep. 30, 2011 and Jun. 7, 2012, and assigned Ser. Nos. 61/541,441 and 61/656,729, respectively, the entire content of each of which is incorporated herein by reference.

BACKGROUND OF THE INVENTION

1. Field of the Invention

The present invention relates generally to wireless communication systems and more specifically, to transmission power control of sounding reference signals.

2. Description of the Art

A communication system includes a DownLink (DL) that conveys signals from at least one Transmission Point (TP) to User Equipments (UEs), and an UpLink (UL) that conveys signals from UEs to at least one Reception Point (RP). A UE, also referred to as a fixed or mobile terminal or a mobile station, includes a wireless device, a cellular phone, a personal computer device, and the like. A TP or an RP is generally a fixed station and is also referred to as a Base Transceiver System (BTS), a NodeB, an access point, and the like.

A communication system also supports several signal types of transmissions including data signals conveying information content, control signals enabling proper processing of data signals, and Reference Signals (RS), also known as pilots, enabling coherent demodulation of data or control signals or providing Channel State Information (CSI) corresponding to an estimate of a channel medium experienced by their transmissions.

DL data information is conveyed through a Physical DL Shared CHannel (PDSCH). DL Control Information (DCI) includes Scheduling Assignments (SAs) for Physical UL Shared CHannel (PUSCH) transmissions from UEs (UL SAs) or for PDSCH receptions by UEs (DL SAs). The SAs are conveyed through DCI formats transmitted in respective Physical DL Control CHannels (PDCCHs). In addition to SAs, PDCCHs may convey DCI that is common to all UEs or to a group of UEs. DCI also includes ACKnowledgment (ACK) information associated with a Hybrid Automatic Repeat reQuest (HARD) ACK (HARQ-ACK) process transmitted to UEs from at least one TP through Physical HARQ-ACK Indicator CHannels (PHICHs) in response to respective receptions at RPs of data Transport Blocks (TBs) transmitted from the UEs.

UL data information is conveyed through a Physical UL Shared CHannel (PUSCH). UL Control Information (UCI) is conveyed through a Physical UL Control CHannel (PUCCH), unless a UE also transmits a PUSCH, in which case the UE may convey at least some UCI in the PUSCH. UCI includes HARQ-ACK information and is transmitted in response to a reception by a UE of data TBs. HARQ-ACK signaling is periodic or dynamic, if a respective reception of data TBs by a UE is semi-persistently (periodically) scheduled without a respective PDCCH or dynamically scheduled by a PDCCH. Other periodically transmitted UCI signaling includes DL CSI informing a NodeB of a channel medium experienced by a signal transmission to a UE and Scheduling Request (SR) informing a NodeB that a respective UE has data to transmit. A UL RS is used for demodulation of data or control signals, in which case the UL RS is referred to as DeModulation RS (DMRS), or to sound a UL channel medium and provide NodeBs with UL CSI, in which case it is referred to as a Sounding RS (SRS).

Typically, PDCCHs are a major part of a DL overhead. One method for reducing this overhead is to scale its size according to the resources required to transmit the PDCCHs and PHICHs in a DL Transmission Time Interval (TTI). Assuming Orthogonal Frequency Division Multiple Access (OFDMA) as the DL transmission method, a Control Format Indicator (CFI) parameter is transmitted through a Physical Control Format Indicator CHannel (PCFICH) to indicate a number of OFDM symbols allocated to a DL control region during a DL TTI.

FIG. 1 is a diagram illustrating a conventional structure for a DL control region in a DL TTI.

Referring to FIG. 1, a DL TTI includes one subframe having M symbols and a DL control region occupies a first N subframe symbols 110. The remaining M−N subframe symbols are primarily used to transmit PDSCHs 120. A PCFICH 130 is transmitted in some sub-carriers, also referred to as Resource Elements (REs) of the first symbol and conveys 2 bits indicating a PDCCH size of M=1, or M=2, or M=3 symbols. A PHICH 140 is also transmitted in some REs of the first symbol. Moreover, some symbols also contain RS REs, 150 and 160, that are common to all UEs for each of the TP antenna ports which in FIG. 1 are assumed to be two ports. The main purposes of UE-Common RS (CRS) are to enable a UE to obtain a channel estimate for its DL channel medium and to perform other measurements and functions. The remaining REs in the DL control region are used to transmit PDCCHs.

PDCCHs conveying SAs are not transmitted at predetermined locations in a DL control region and, as a consequence, each UE needs to perform multiple decoding operations to determine whether it has an SA in a DL subframe. To assist a UE with the multiple decoding operations, REs carrying a PDCCH are grouped into Control Channel Elements (CCEs) in the logical domain. For a given number of DCI format bits, a number of PDCCH CCEs depends on a channel coding rate, assuming Quadrature Phase Shift Keying (QPSK) as the modulation scheme. For UEs experiencing low or high DL Signal-to-Interference and Noise Ratio (SINR), TPs may respectively use a low or high channel coding rate for a PDCCH transmission in order to achieve a desired BLock Error Rate (BLER). Therefore, a PDCCH transmission to a UE experiencing low DL SINR may require more CCEs than a PDCCH transmission to a UE experiencing high DL SINR (different power boosting of REs of a CCE may also apply). Typical CCE aggregation levels for a PDCCH are, for example, of 1, 2, 4, and 8 CCEs.

For a PDCCH decoding process a UE determines a search space for candidate PDCCHs according to a common set of CCEs for all UEs (Common Search Space or CSS) and according to a UE-dedicated set of CCEs (UE-Dedicated Search Space or UE-DSS). The CSS may consist of the first $N_{CCE}^{UE\text{-}CSS}$ CCEs in the logical domain. The UE-DSS is determined according to a pseudo-random function having as inputs UE-common parameters, such as a subframe number or a total number of CCEs in a subframe, and UE-specific parameters such as a Radio Network Temporary Identifier (RNTI). For example, for CCE aggregation levels L∈{1, 2, 4, 8}, the CCEs for PDCCH candidate m are given by $L \cdot \{(Y_k + m) \bmod \lfloor N_{CCE,k}/L \rfloor\} + i$ where $N_{CCE,k}$ is a total number of CCEs in subframe k, i=0, ..., L−1, m=0, ..., $M^{(L)}−1$, $M^{(L)}$ is a number of PDCCH candidates to monitor in a search space, and $\lfloor \; \rfloor$ is the "floor" function rounding a number to its immediately smaller integer. Exemplary values of $M^{(L)}$ for L∈{1, 2, 4, 8} are, respectively, {0, 0, 4, 2} in the UE-CSS, and {6, 6, 2, 2} in the UE-DSS. For the CSS, $Y_k$=0. For the UE-DSS, $Y_k$=(A·$Y_{k−1}$)mod D where $Y_{−1}$=RNTI≠0, A=39827 and D=65537.

PDCCHs conveying information to multiple UEs, such as a PDCCH conveying Transmission Power Control (TPC) commands for UEs for adjusting respective PUSCH or PUCCH transmission powers, are transmitted in the CSS. If enough CCEs remain in the CSS after transmitting PDCCHs conveying DCI to multiple UEs in a subframe, the CSS is also used to transmit PDCCHs providing SAs with specific DCI formats. The UE-DSS is exclusively used to transmit PDCCHs providing SAs. For example, the CSS may consist of 16 CCEs and support 2 PDCCHs with L=8 CCEs, or 4 PDCCHs with L=4 CCEs, or 1 PDCCH with L=8 CCEs and 2 PDCCHs with L=4 CCEs. The CCEs for the CSS are placed first in the logical domain (prior to an interleaving of CCEs).

FIG. 2 is a diagram illustrating a conventional PDCCH transmission process.

Referring to FIG. 2, after channel coding and rate matching, encoded bits of DCI formats are mapped to CCEs in the logical domain. The first 4 CCEs (L=4), CCE1 201, CCE2 202, CCE3 203, and CCE4 204 are used to transmit PDCCH to UE1. The next 2 CCEs (L=2), CCE5 211 and CCE6 212, are used to transmit PDCCH to UE2. The next 2 CCEs (L=2), CCE7 221 and CCE8 222, are used to transmit PDCCH to UE3. Finally, the last CCE (L=1), CCE9 231, is used to transmit PDCCH to UE4. The DCI format bits of a PDCCH is scrambled 240 with a binary scrambling code and are subsequently modulated 250. Each CCE is further divided into Resource Element Groups (REGs). For example, a CCE including 36 REs is divided into 9 REGs, each including 4 REs. Interleaving 260 is applied among REGs (blocks of 4 QPSK symbols). For example, a block interleaver is used with interleaving performed on symbol-quadruplets (4 QPSK symbols corresponding to 4 REs of a REG) instead of on individual bits. After REG interleaving, a resulting series of QPSK symbols is shifted by J symbols 270, and finally each QPSK symbol is mapped to an RE 280 in the DL control region of a subframe. Therefore, in addition to RS from TP antenna ports, 291 and 292, and other control channels such as a PCFICH or a PHICH 293, REs in a DL control contain QPSK symbols corresponding to DCI formats for UE1 294, UE2 295, UE3 296, and UE4 297.

After the reception of a PDSCH, a UE transmits HARQ-ACK information in a PUCCH to indicate the correct (ACK) or incorrect (NACK) reception of data TBs in a PDSCH.

FIG. 3 is a diagram illustrating a conventional structure for HARQ-ACK signal transmission in a PUCCH.

Referring to FIG. 3, HARQ-ACK signals, and RS enabling coherent demodulation of HARQ-ACK signals, are transmitted in one slot 310 of a PUCCH subframe including 2 slots. HARQ-ACK information bits 320 modulate 330 a Zadoff-Chu (ZC) sequence 340, for example using BPSK or QPSK, which is then transmitted after performing an Inverse Fast Fourier Transform (IFFT) operation. Each RS 350 is transmitted through an unmodulated ZC sequence.

For a UL system BandWidth (BW) including $N_{RB}^{max,UL}$ Resource Blocks (RBs), where each RB includes $N_{sc}^{RB}$=12 REs, a ZC sequence $r_{u,v}^{(\alpha)}(n)$ is defined by a Cyclic Shift (CS) α of a base ZC sequence $\bar{r}_{u,v}(n)$ according to $r_{u,v}(\alpha)(n) = e^{j\alpha n} \bar{r}_{u,v}(n)$, $0 \le n < M_{sc}^{RS}$, where $M_{sc}^{RS}=mN_{sc}^{RB}$ is a length of a ZC sequence, $1 \le m \le N_{RB}^{max,UL}$, $\bar{r}_{u,v}(n)=x_q(n \bmod N_{ZC}^{RS})$ where the $q^{th}$ root ZC sequence is defined by $$x_q(m) = \exp\left(\frac{-j\pi qm(m+1)}{N_{ZC}^{RS}}\right),$$

$0 \le m \le N_{ZC}^{RS}-1$ with q given by $q=\lfloor \bar{q}+\frac{1}{2} \rfloor + v \cdot (-1)^{\lfloor 2\bar{q} \rfloor}$ and $\bar{q}$ given by $\bar{q}=N_{ZC}^{RS} \cdot (u+1)/31$. The length $N_{ZC}^{RS}$ of a ZC sequence is given by the largest prime number such that $N_{ZC}^{RS} < M_{sc}^{RS}$. Multiple RS sequences are defined from a single base sequence through different values of α. A PUCCH transmission is assumed to be in one RB ($M_{sc}^{RS}=N_{sc}^{RB}$).

FIG. 4 is a diagram illustrating a conventional transmitter for a ZC sequence.

Referring to FIG. 4, a mapper 420 maps a ZC sequence 410 to REs of an assigned transmission BW as they are indicated by RE selection unit 425. Subsequently, an IFFT is performed by IFFT unit 430, a CS is applied to the output by CS unit 440, followed by scrambling with a cell-specific sequence using scrambler 450, a Cyclic Prefix (CP) is inserted by CP insertion unit 460, and the resulting signal is filtered by filter 470. Finally, a transmission power $P_{PUCCH}$ is applied by power amplifier 480 and the ZC sequence is transmitted 490.

Different CSs of a ZC sequence provide orthogonal ZC sequences. Therefore, different CSs of a same ZC sequence are allocated to different UEs in a same PUCCH RB and achieve orthogonal multiplexing for respective HARQ-ACK signal and RS transmissions. Orthogonal multiplexing can also be in the time domain using Orthogonal Covering Codes (OCCs) where PUCCH symbols used for HARQ-ACK signal or RS transmission in each slot are respectively multiplied with a first OCC and a second OCC. For example, for the structure in FIG. 3, HARQ-ACK signal transmission is modulated by a length-4 OCC, such as a Walsh-Hadamard (WH) OCC, while RS transmission is modulated by a length-3 OCC, such as a Discrete Fourier Transform (DFT) OCC. In this manner, the multiplexing capacity is increased by a factor of 3 (determined by the OCC with the smaller length $N_{oc}$). The WH OCCs, {$W_0$, $W_1$, $W_2$, $W_3$}, and DFT OCCs, {$D_0$, $D_1$, $D_2$}, are:

$$\begin{bmatrix} W_0 \\ W_1 \\ W_2 \\ W_3 \end{bmatrix} = \begin{bmatrix} 1 & 1 & 1 & 1 \\ 1 & -1 & 1 & -1 \\ 1 & 1 & -1 & -1 \\ 1 & -1 & -1 & 1 \end{bmatrix}, \begin{bmatrix} D_0 \\ D_1 \\ D_2 \end{bmatrix} = \begin{bmatrix} 1 & 1 & 1 \\ 1 & e^{-j2\pi/3} & e^{-j4\pi/3} \\ 1 & e^{-j4\pi/3} & e^{-j2\pi/3} \end{bmatrix}.$$

Table 1 presents a mapping of a PUCCH resource $n_{PUCCH}$ to an OC $n_{oc}$ and a CS α for a HARQ-ACK signal and RS transmission. For brevity, the RS associated with the HARQ-ACK signal will not be mentioned in the following. As a PUCCH is assumed to be transmitted over 1 RB including 12 REs, there is a total of 12 CS for a ZC sequence.

TABLE 1

HARQ-ACK Signal and RS Resource Mapping to OC and CS

| | OC $n_{oc}$ for HARQ-ACK Signal and for RS | | |
|---|---|---|---|
| CS α | $W_0, D_0$ | $W_1, D_1$ | $W_3, D_2$ |
| 0 | $n_{PUCCH}=0$ | | $n_{PUCCH}=12$ |
| 1 | | $n_{PUCCH}=6$ | |
| 2 | $n_{PUCCH}=1$ | | $n_{PUCCH}=13$ |

TABLE 1-continued

HARQ-ACK Signal and RS Resource Mapping to OC and CS

| | OC $n_{oc}$ for HARQ-ACK Signal and for RS | | |
|---|---|---|---|
| CS α | $W_0, D_0$ | $W_1, D_1$ | $W_3, D_2$ |
| 3 | | $n_{PUCCH} = 7$ | |
| 4 | $n_{PUCCH} = 2$ | | $n_{PUCCH} = 14$ |
| 5 | | $n_{PUCCH} = 8$ | |
| 6 | $n_{PUCCH} = 3$ | | $n_{PUCCH} = 15$ |
| 7 | | $n_{PUCCH} = 9$ | |
| 8 | $n_{PUCCH} = 4$ | | $n_{PUCCH} = 16$ |
| 9 | | $n_{PUCCH} = 10$ | |
| 10 | $n_{PUCCH} = 5$ | | $n_{PUCCH} = 17$ |
| 11 | | $n_{PUCCH} = 11$ | |

A UE can determine a conventional PUCCH resource $n_{PUCCH}$, for its HARQ-ACK signal transmission either through explicit signaling from serving TP(s) or through implicit signaling. The latter is based on CCEs used to transmit a PDCCH conveying a respective DL SA in response to which a UE transmits a HARQ-ACK signal. A one-to-one mapping may exist between conventional PUCCH resources used to transmit HARQ-ACK signals and CCEs used to transmit PDCCHs. For example, for UEs with one transmitter antenna port and a PDCCH transmission structure as in FIG. 2, a UE determines a conventional PUCCH resource for HARQ-ACK signaling from a CCE with a lowest index from a respective DL SA transmission. Then, UE1, UE2, UE3, and UE4 can respectively use PUCCH resource 1, 5, 7, and 9. If all PUCCH resources within an RB are used, resources in the immediately next RB are used. In general, a UE can determine a conventional PUCCH resource $n_{PUCCH}$ for HARQ-ACK signaling as $n_{PUCCH} = n_{CCE} + N_{PUCCH}$ where $n_{CCE}$ is a CCE with a lowest index for a respective DL SA and $N_{PUCCH}$ is TP-specific offset that is informed to UEs by higher layer signaling.

Improving coverage and cell-edge throughput are key objectives in communication systems. Coordinated Multi-Point transmission/reception (CoMP) is an important technique to achieve these objectives. CoMP operation relies on the fact that when a UE is in a cell-edge region, it is able to reliably receive a signal combined at a set of TPs (DL CoMP) and reliably transmit a signal combined at a set of RPs (UL CoMP). DL CoMP schemes can range from simple ones of interference avoidance, such as coordinated scheduling, to more complex ones requiring accurate and detailed channel information such as joint transmission from multiple TPs. UL CoMP schemes can also range from simple ones where PUSCH scheduling is performed considering a single RP to more complex ones where received signal characteristics and generated interference at multiple RPs are considered.

FIG. 5 is a diagram illustrating a conventional UL CoMP operation.

Referring to FIG. 5, a signal transmitted by a UE 510 is received from two RPs, RP1 520 and RP2 530. Scheduling coordination between the two RPs and combining of the respective received signals is facilitated by a fast backhaul link such as an optical fiber link.

Support of UL CoMP introduces new requirements for HARQ-ACK signaling in a PUCCH. As conventional HARQ-ACK signaling scrambles a respective ZC sequence with a respective RP-specific (cell-specific) sequence, it is not possible to support orthogonal multiplexing of HARQ-ACK signals in a same RB for reception at multiple RPs. For this reason, separate PUCCH RBs should be used for UL CoMP reception of HARQ-ACK signals. The scrambling of such HARQ-ACK signals is with a scrambling sequence that is common for all RPs constituting a set of UL CoMP RPs for a respective set of UEs (a CoMP-set specific ZC sequence is UE-specific and signaled to a UE by higher layer signaling).

The need to provide non-conventional PUCCH resources to support orthogonal multiplexing of HARQ-ACK signals for reception at multiple RPs, relative to conventional PUCCH resources supporting orthogonal multiplexing of HARQ-ACK signals for reception at a single RP, is associated with a respective increase in the UL overhead which reduces UL throughout.

Additionally, if both a conventional PDCCH and non-conventional PDCCH types are transmitted in a same subframe, collisions of PUCCH resources may occur, if the respective CCEs of the various PDCCH types are independently indexed and non-conventional PUCCH resources may then need to be configured for each of the non-conventional PDCCH types.

Therefore, there is a need to reduce an overhead resulting from assigning non-conventional PUCCH resources for transmissions of HARQ-ACK signals.

There is another need to provide mappings for compressing an amount of non-conventional PUCCH resources for HARQ-ACK signaling.

Finally, there is another need for indicating to a UE whether to use a conventional PUCCH resource or a non-conventional PUCCH resource for its HARQ-ACK signaling.

SUMMARY OF THE INVENTION

Accordingly, an aspect of the present invention is to solve at least the above-described problems occurring in the prior art and at least the advantages described below.

Another aspect of the present invention is to provide methods and apparatus for performing HARQ-ACK signal transmissions while providing compression of respective resources and providing mechanisms for selecting between conventional PUCCH resources and non-conventional PUCCH resources.

According to an aspect of the present invention, a method is provided for a UE to transmit a control signal using a first sequence or a second sequence in response to a detected control channel. The method includes determining a first resource for the control signal transmission from a sum of a lowest CCE index of the detected control channel and a first offset, if the UE is not configured to use the second sequence by higher layer signaling; determining a second resource for the control signal transmission from a sum of the lowest CCE index of the detected control channel and a second offset, if the UE is configured to use the second sequence by the higher layer signaling; and transmitting the control signal in the first resource or in the second resource.

According to another aspect of the present invention, a method is provided for transmitting a control signal from a UE in a first resource or in a second resource in response to a detected control channel. The method includes determining the first resource from a sum of a lowest CCE index of the detected control channel and a first offset, or determining the second resource from a sum of the lowest CCE index of the detected control channel and a second offset; transmitting the control signal with a first sequence in the first resource, if the UE is not configured to use a second sequence by higher layer signaling; and transmitting the control signal with the second sequence in the second resource, if the UE is configured to use the second sequence by the higher layer signaling. The first sequence is specific to a transmission point transmitting the detected control channel and the second sequence is specific to the UE apparatus.

According to another aspect of the present invention, a UE apparatus is configured to transmit a control signal using a first sequence or a second sequence in response to a detected control channel. The UE apparatus includes a selector configured to select a first resource from first resources, if the UE apparatus is not configured to use the second sequence by higher layer signaling, wherein the first resource is determined from a sum of a lowest CCE index of the detected control channel and a first offset, and to select a second resource from second resources, if the UE apparatus is configured to use the second sequence by the higher layer signaling, wherein the second resource is determined from a sum of the lowest CCE index of the detected control channel and a second offset; and a transmitter configured to transmit the control signal in the first resource or in the second resource.

According to another aspect of the present invention, a UE apparatus is configured to transmit a control signal in a first resource or in a second resource in response to a detected control channel. The UE apparatus includes a mapper configured to map a sum of a lowest CCE index of the detected control channel and a first offset to the first resource, or to map a sum of the lowest CCE index of the detected control channel and a second offset to the second resource; and a transmitter configured to transmit the control signal with a first sequence in the first resource, if the UE apparatus is not configured to use a second sequence by higher layer signaling, and to transmit the control signal with the second sequence in the second resource, if the UE apparatus is configured to use the second sequence by the higher layer signaling. The first sequence is specific to a transmission point transmitting the detected control channel and the second sequence is specific to the UE apparatus.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

Various embodiments of the present invention will now be described in detail with reference to the accompanying drawings. This present invention may, however, be embodied in many different forms and should not be construed as limited to the embodiments described herein.

Additionally, although the embodiments of the present invention are described below with reference to Discrete Fourier Transform (DFT)-spread Orthogonal Frequency Division Multiplexing (OFDM), they also are applicable to all Frequency Division Multiplexing (FDM) transmissions in general and to OFDM in particular.

Moreover, although the embodiments of the present invention for HARQ-ACK signaling in non-conventional PUCCH resources will be described below with respect to a UL CoMP operation, they are also applicable to any such HARQ-ACK signaling in general and to HARQ-ACK signaling in response to a detected non-conventional PDCCH type in particular.

According to one aspect of the present invention, there are provided designs for implicit mappings compressing an amount of non-conventional PUCCH resources required to support transmissions of HARQ-ACK signals from UEs. These non-conventional PUCCH resources are in different RBs than PUCCH resources used for conventional HARQ-ACK signal transmissions. A UE is configured by higher layer signaling to use either conventional PUCCH resources or non-conventional PUCCH resources for its HARQ-ACK signal transmission. In the former case, a UE uses a TP-specific ZC sequence for HARQ-ACK signaling while in the latter case a UE uses a UE-specific ZC sequence for HARQ-ACK signaling that is informed to the UE by higher layer signaling. Dynamic selection between conventional and non-conventional PUCCH resources is also addressed below.

Figure 1:
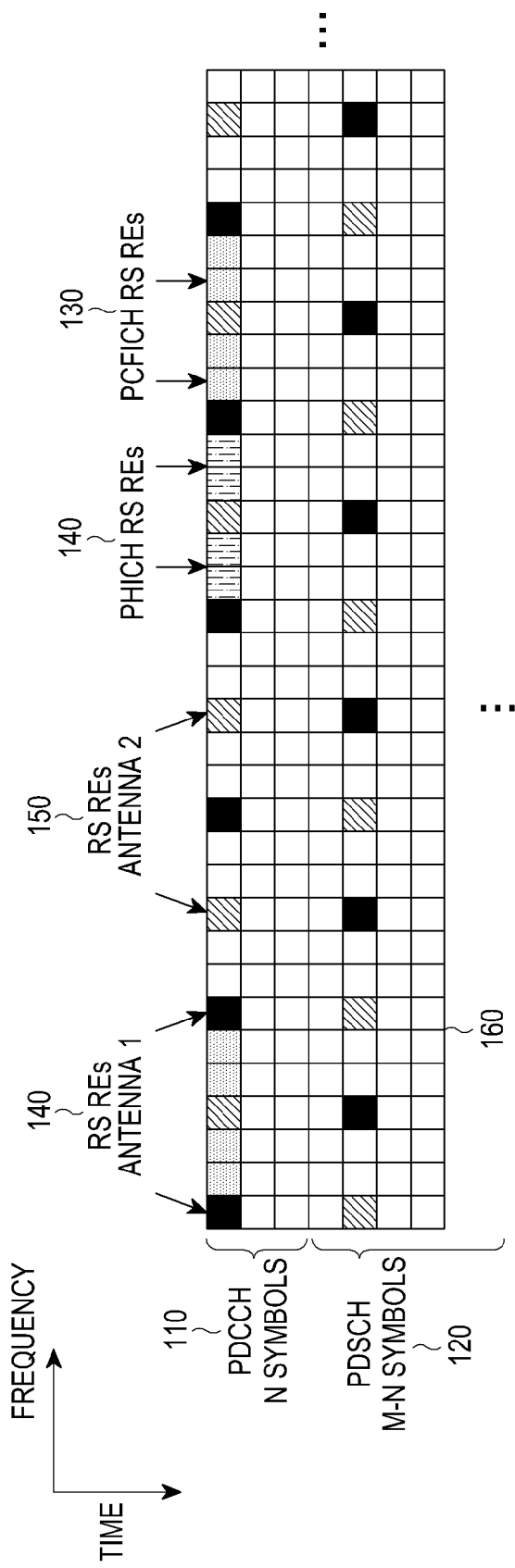
FIG. 1 is a diagram illustrating a conventional structure for a DL control region in a DL TTI.
Figure 2:
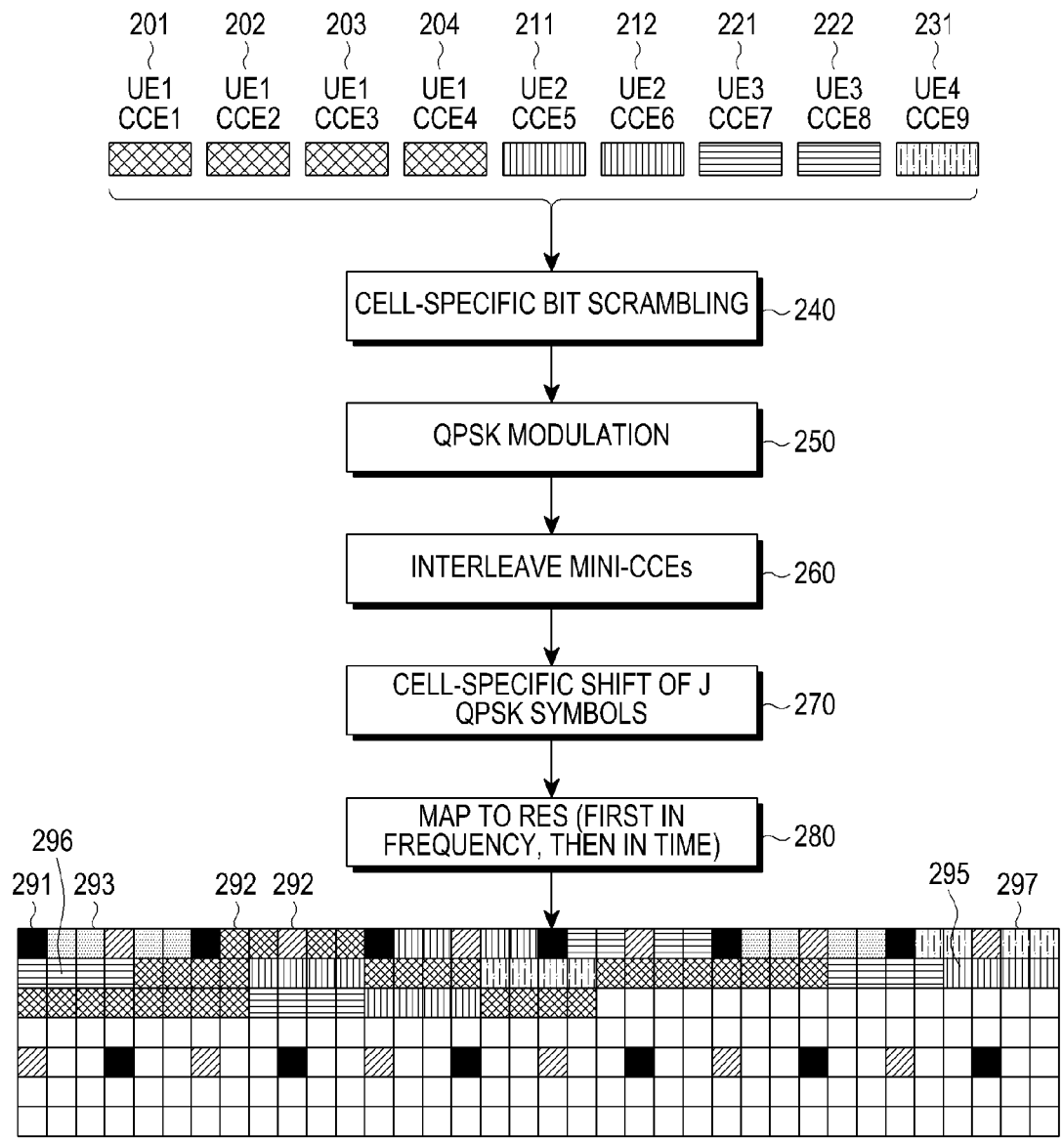
FIG. 2 is a diagram illustrating a conventional PDCCH transmission process.
Figure 3:
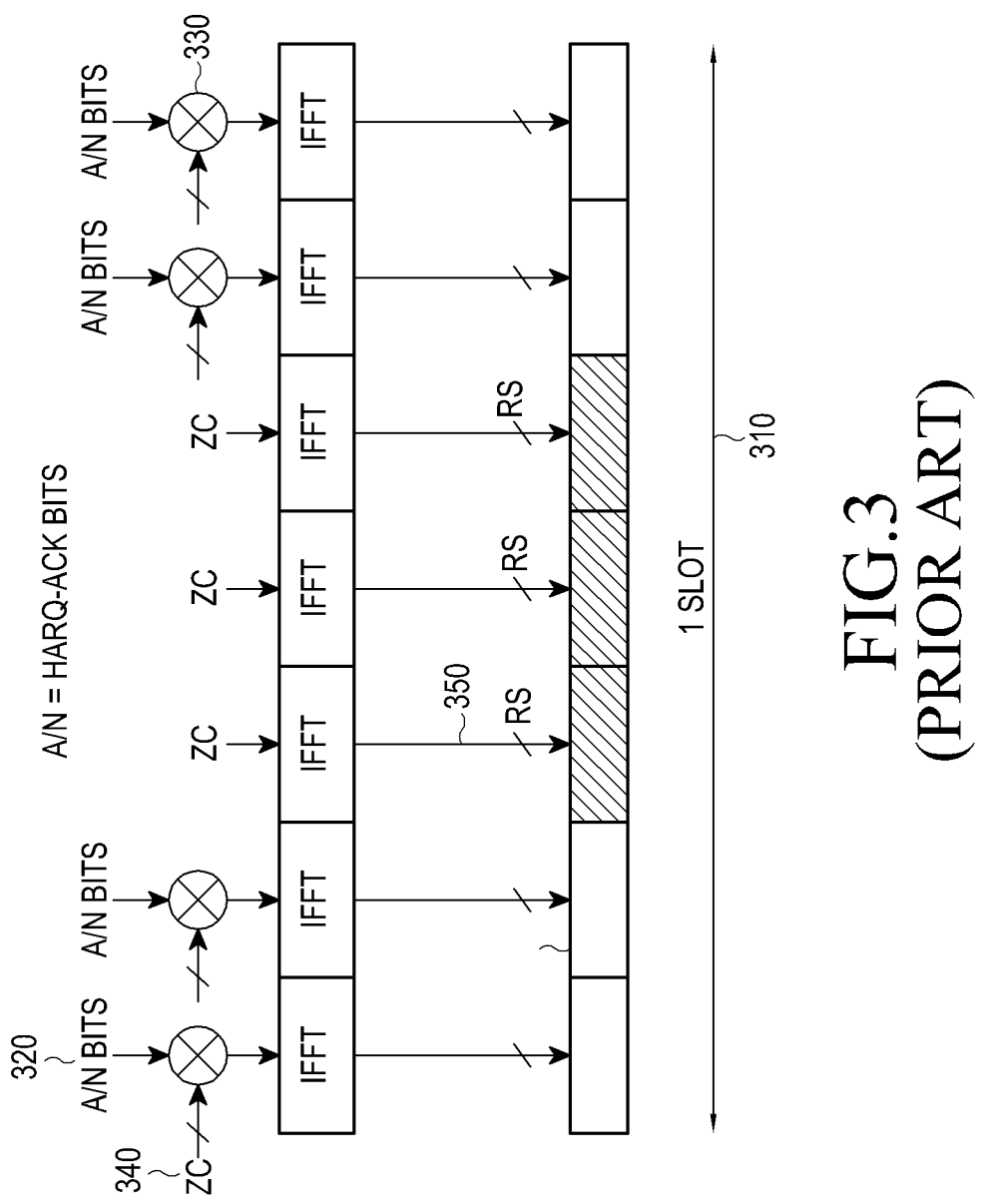
FIG. 3 is a diagram illustrating a conventional structure for HARQ-ACK signal transmission in a PUCCH.
Figure 4:
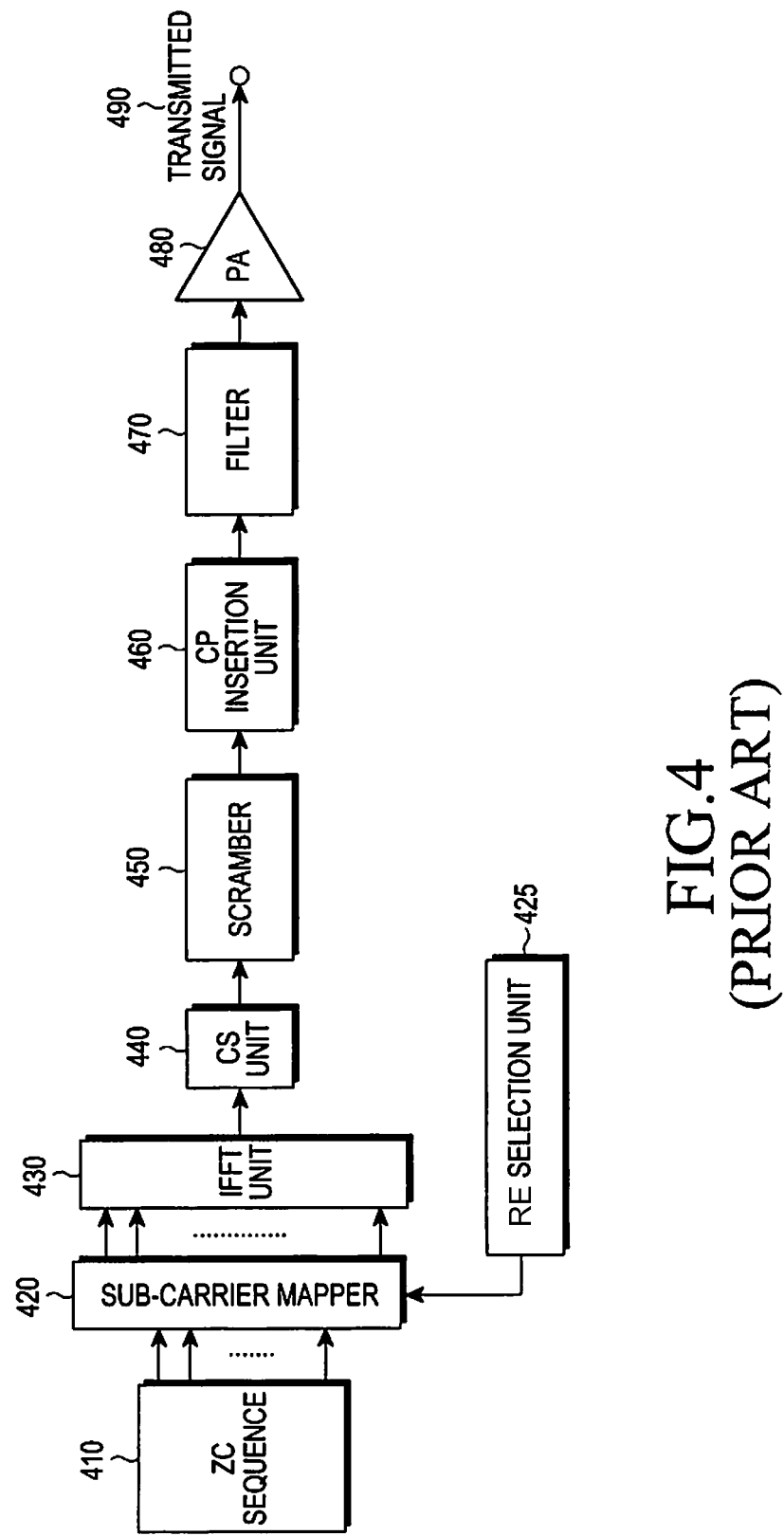
FIG. 4 is a block diagram illustrating a conventional transmitter for a ZC sequence.
Figure 5:
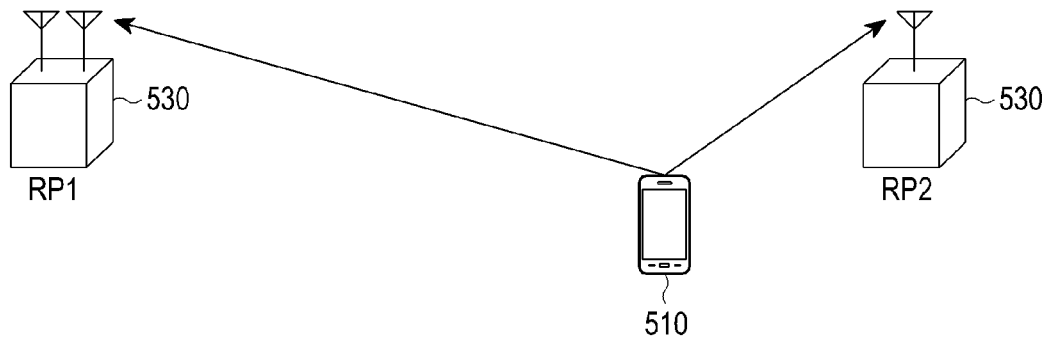
FIG. 5 is a diagram illustrating a conventional UL CoMP operation.

Table 2 lists a number of PUCCH RBs required for HARQ-ACK signaling using a conventional, one-to-one, mapping between a PDCCH CCE and a PUCCH resource. It is assumed that a DL system BW includes $N_{RB}^{max,DL}=100$ RBs (each RB includes $N_{sc}^{RB}=12$ REs) and a RS transmission in a DL control region is from two antenna ports and only in a first OFDM symbol, as illustrated in FIG. 1. Furthermore, it is assumed that there are 4 REGs for PCFICH transmission and 6 REGs for PHICH transmissions. If a fractional PUCCH RB is needed for HARQ-ACK signal transmission, it is assumed to be rounded to a whole RB if it may not support transmission of signals other than HARQ-ACK signals. Then, for $N_{CCE}$ CCEs available for PDCCH transmissions (a DL subframe index is omitted for simplicity), a number of PUCCH RBs for HARQ-ACK signal transmissions is $\lceil N_{CCE} \cdot \Delta_{shift}^{PUCCH}/(N_{sc}^{RB} \cdot N_{oc}) \rceil$ where $\lceil \ \rceil$ is the "ceiling" function which rounds a number to its immediately larger integer.

TABLE 2

Number of CCEs for PDCCHs and Number
of PUCCH RBs for HARQ-ACK Signals

| | | |
|---|---|---|
| Number of OFDM symbols in a DL control region | 3 | 2 |
| Number of CCEs for PDCCHs | 87 | 54 |
| Number of PUCCH RBs for HARQ-ACK Signals, $\Delta_{shift}^{PUCCH} = 3$ | $\lceil 87 \cdot 3/(12 \cdot 3) \rceil = 8$ | $\lceil 54 \cdot 3/(12 \cdot 3) \rceil = 5$ |
| Number of PUCCH RBs for HARQ-ACK Signals, $\Delta_{shift}^{PUCCH} = 2$ | $\lceil 87 \cdot 2/(12 \cdot 3) \rceil = 5$ | $\lceil 54 \cdot 2/(12 \cdot 3) \rceil = 3$ |

As evident in Table 2, for a given number of TP antenna ports and a given number of PCFICH and PHICH REGs, PUCCH overhead for HARQ-ACK signaling is variable, depends on a number of OFDM symbols of a DL control region and on a value of $\Delta_{shift}^{PUCCH}$, and can reach a maximum value of 8 RBs.

If the conventional derivation of PUCCH resources is also applied for deriving non-conventional PUCCH resources for HARQ-ACK signaling then, for a UL system BW including $N_{RB}^{max,UL}=100$ RBs, the non-conventional resource overhead can reach 8% and this directly decreases UL throughput by at least a same amount. A significant UL throughput reduction occurs even for the smaller non-conventional resource overhead values.

A reduction in UL overhead due to the non-conventional PUCCH resources can be achieved by using different mappings between the PDCCH CCEs and the non-conventional PUCCH resources for transmissions of HARQ-ACK signals in order to achieve compression for the latter. As in the example in Table 2 the total number of PDCCH CCEs can be 87 while the total number of PDCCHs conveying DL SAs in a subframe is typically less than 10, substantial redundancy exists in the one-to-one mapping between PDCCH CCEs and PUCCH resources for transmissions of HARQ-ACK signals.

A first approach to compress non-conventional PUCCH resources for HARQ-ACK signaling is to exclude from the mapping the $N_{CCE}^{CSS}$ CCEs of the CSS as respective PDCCH transmissions typically address groups of UEs and respective HARQ-ACK signaling may not exist. Even if some CCEs of the CSS are used to transmit SAs, these SAs can be limited to UL SAs or to SAs for UEs for which transmissions of HARQ-ACK signals are not intended to be orthogonally multiplexed for reception at a same set of multiple RPs. Then, $N_{CCE}-N_{CCE}^{CSS}$ non-conventional PUCCH resources corresponding to $\lceil (N_{CCE}-N_{CCE}^{CSS}) \cdot \Delta_{shift}^{PUCCH}/(N_{sc}^{RB} \cdot N_{oc}) \rceil$ RBs are allocated for HARQ-ACK signaling.

Table 3 lists a corresponding number of PUCCH RBs for HARQ-ACK signaling excluding $N_{CCE}^{UE-CSS}$ CCEs of the CSS.

TABLE 3

PUCCH RBs for HARQ-ACK signals excluding
CSS CCEs from resource mapping.

| | | |
|---|---|---|
| Number of OFDM symbols in a DL control region | 3 | 2 |
| Number of CCEs for PDCCHs | 71 | 38 |
| Number of PUCCH RBs for HARQ-ACK Signals, $\Delta_{shift}^{PUCCH} = 3$ | $\lceil 71 \cdot 3/12 \cdot 3) \rceil = 6$ | $\lceil 38 \cdot 3/(12 \cdot 3) \rceil = 4$ |
| Number of PUCCH RBs for HARQ-ACK Signals, $\Delta_{shift}^{PUCCH} = 2$ | $\lceil 71 \cdot 2/12 \cdot 3) \rceil = 4$ | $\lceil 38 \cdot 2/(12 \cdot 3) \rceil = 3$ |

As evident in Table 3, a maximum number of non-conventional PUCCH RBs is reduced by 2 representing a 25% reduction. Further, by applying a minor scheduling restriction and not using the last 2 CCEs to convey DL SAs to UEs for which HARQ-ACK signals are to be orthogonally received at a same set of multiple RPs, a number of RBs required for HARQ-ACK signaling when a DL control region includes 2 OFDM symbols is 3 for $\Delta_{shift}^{PUCCH}=3$ and 2 for $\Delta_{shift}^{PUCCH}=2$ (and not 4 and 3 as listed in Table 2). Therefore, a total UL overhead reduction of 2% is achieved by excluding CSS CCEs from mapping to non-conventional PUCCH resources for HARQ-ACK signaling.

Figure 6:
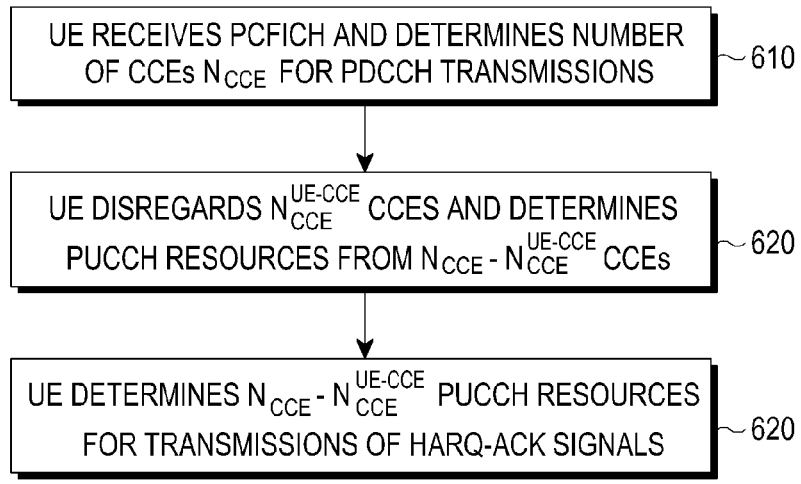
FIG. 6 is a diagram illustrating a mapping of PDCCH CCEs to non-conventional PUCCH resources used for HARQ-ACK signaling from UEs by excluding CSS CCEs, according to an embodiment of the present invention.

FIG. 6 is a diagram illustrating a mapping of PDCCH CCEs to non-conventional PUCCH resources for HARQ-ACK signaling from UEs by excluding CSS CCEs.

Referring to FIG. 6, a UE determines a number $N_{CCE}$ of CCEs available for PDCCH transmissions from a value conveyed in a PCFICH 610. If a UE incorrectly decodes a PCFICH then, due to interleaving of PDCCH CCEs, it will also miss its DL SA (if any) and will therefore not transmit a HARQ-ACK signal. From the $N_{CCE}$ CCEs, a UE excludes the $N_{CCE}^{CSS}$ CSS CCEs (which are predetermined in the system operation) and considers only the remaining $N_{CCE}-N_{CCE}^{CSS}$ CCEs for determining non-conventional PUCCH resources for HARQ-ACK signaling 620. Finally, using a one-to-one mapping between remaining CCEs and non-conventional PUCCH resources for HARQ-ACK signaling, a UE determines $N_{CCE}-N_{CCE}^{CSS}$ such non-conventional PUCCH resources corresponding to $\lceil (N_{CCE}-N_{CCE}^{CSS}) \cdot \Delta_{shift}^{PUCCH}/(N_{sc}^{RB} \cdot N_{oc}) \rceil$ RBs 630.

A second approach to reduce an overhead for non-conventional PUCCH resources for HARQ-ACK signaling from UEs is to increase a granularity of CCE mapping to a PUCCH resource. Instead of a conventional mapping uniquely linking one CCE with one PUCCH resource, $N_{COMP}$ consecutive CCEs in the logical domain (prior to interleaving) can be linked with a single non-conventional PUCCH resource for HARQ-ACK signaling. Then, non-conventional PUCCH resources can be compressed by a factor of $N_{COMP}$.

Table 4 lists a number of PUCCH RBs for HARQ-ACK signaling when a PUCCH resource corresponds to $N_{COMP}=2$ CCEs.

TABLE 4

PUCCH RBs for HARQ-ACK Signaling - Mapping
of 2 CCEs to one PUCCH Resource

| | | |
|---|---|---|
| Number of OFDM symbols in a DL control region | 3 | 2 |
| Number of CCEs for PDCCHs | 87 | 54 |
| Number of PUCCH RBs for HARQ-ACK Signals, $\Delta_{shift}^{PUCCH} = 3$ | $\lceil 87 \cdot 3/(12 \cdot 3 \cdot 2) \rceil = 4$ | $\lceil 54 \cdot 3/(12 \cdot 3 \cdot 2) \rceil = 3$ |
| Number of PUCCH RBs for HARQ-ACK Signals, $\Delta_{shift}^{PUCCH} = 2$ | $\lceil 87 \cdot 2/(12 \cdot 3 \cdot 2) \rceil = 3$ | $\lceil 54 \cdot 2/(12 \cdot 3 \cdot 2) \rceil = 2$ |

As evident in Table 4, a maximum number of non-conventional PUCCH RBs is reduced by 4 representing a total UL overhead reduction of 4% and a reduction of 50% in a number of non-conventional PUCCH RBs.

Figure 7:
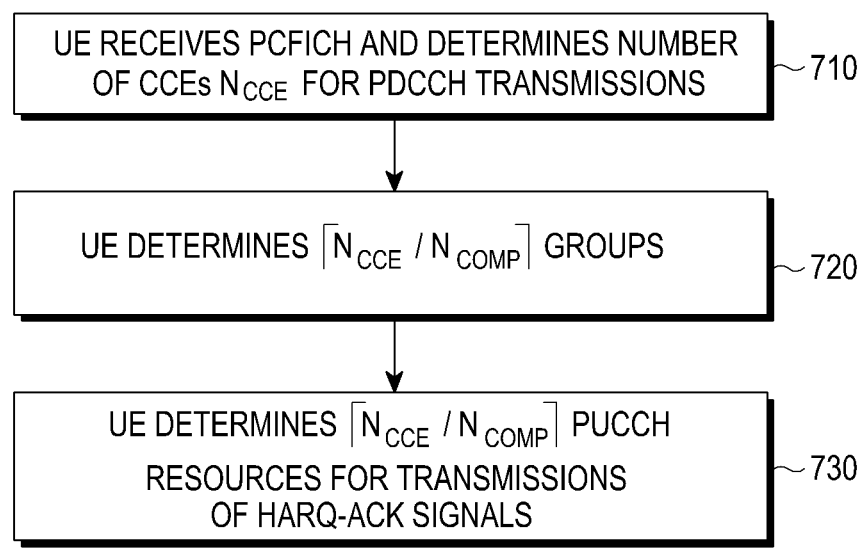
FIG. 7 is a diagram illustrating a mapping of PDCCH CCEs to PUCCH resources for HARQ-ACK signaling from UEs by compressing a mapping of $N_{COMP}$ CCEs to a single PUCCH resource, according to an embodiment of the present invention.

FIG. 7 is a diagram illustrating a mapping of PDCCH CCEs to PUCCH resources for HARQ-ACK signaling from UEs by compressing a mapping of $N_{COMP}$ CCEs to a single PUCCH resource.

Referring to FIG. 7, a UE determines a number $N_{CCE}$ of CCEs available for PDCCH transmissions from a value conveyed in a PCFICH 710. From a number of $N_{CCE}$ CCEs, a UE determines $\lceil N_{CCE}/N_{COMP} \rceil$ groups of $N_{COMP}$ elements (the last group has $N_{CCE}-\lfloor N_{CCE}/N_{COMP} \rfloor \cdot N_{COMP}$ elements) 720. Finally, from a number of $\lceil N_{CCE}/N_{COMP} \rceil$ groups and using a one-to-one mapping, a UE determines $\lceil N_{CCE}/N_{COMP} \rceil$ PUCCH resources 730 available for HARQ-ACK signaling corresponding to $\lceil \lceil N_{CCE}/N_{COMP}\rceil \cdot \Delta_{shift}^{PUCCH}/(N_{sc}^{RB} \cdot N_{oc})\rceil$ RBs and uses a resource determined from mapping a lowest CCE index in a respective DL SA to a group.

The first approach and the second approach can be combined to offer increased compression in a number of non-conventional PUCCH resources for HARQ-ACK signaling from UEs. Table 5 lists a corresponding number of PUCCH RBs for HARQ-ACK signaling when the previous first and second approaches are combined.

TABLE 5

Number of PUCCH RBs for HARQ-ACK signaling excluding CSS CCEs from PUCCH resource mapping and mapping $N_{COMP}$ = 2 CCEs to a single PUCCH resource.

| | | |
|---|---|---|
| Number of OFDM symbols in a DL control region | 3 | 2 |
| Number of CCEs for PDCCHs | 71 | 38 |
| Number of PUCCH RBs for HARQ-ACK Signals, $\Delta_{shift}^{PUCCH}$ = 3 | $\lceil 71 \cdot 3/(12 \cdot 3 \cdot 2)\rceil = 3$ | $\lceil 38 \cdot 3/(12 \cdot 3 \cdot 2)\rceil = 2$ |
| Number of PUCCH RBs for HARQ-ACK Signals, $\Delta_{shift}^{PUCCH}$ = 2 | $\lceil 71 \cdot 2/(12 \cdot 3 \cdot 2)\rceil = 2$ | $\lceil 38 \cdot 2/(12 \cdot 3 \cdot 2)\rceil = 2$ |

As evident in Table 5, a maximum number of non-conventional PUCCH RBs is reduced by 5 representing a total UL overhead reduction of 5% and a reduction of 62.5% in a number of non-conventional PUCCH RBs. Therefore, a maximum non-conventional UL overhead to support orthogonal reception of HARQ-ACK signals is 3% and can often be reduced to 2% or even 1% (for a DL control region of 2 OFDM symbols and for $\Delta_{shift}^{PUCCH}=2$ when the last 2 CCEs in the logical domain are not used to transmit DL SAs to UEs configured use of non-conventional PUCCH resources for HARQ-ACK signaling).

A UE configured for HARQ-ACK signaling in non-conventional PUCCH resources can determine a starting resource either from a PCFICH if all these UEs are served by a same TP or from higher layer signaling if at least some of these UEs are served by different or multiple TPs. In the former approach, based on a PCFICH detection indicating a size of a DL control region conveying DL SAs, a UE can determine a number of PDCCH CCEs and can therefore determine a last conventional PUCCH resource for HARQ-ACK signaling. The non-conventional PUCCH resources for HARQ-ACK signaling may then start at the next RB or the next resource. In the latter approach, a UE is explicitly configured a first non-conventional PUCCH resource for HARQ-ACK signaling.

Figure 8:
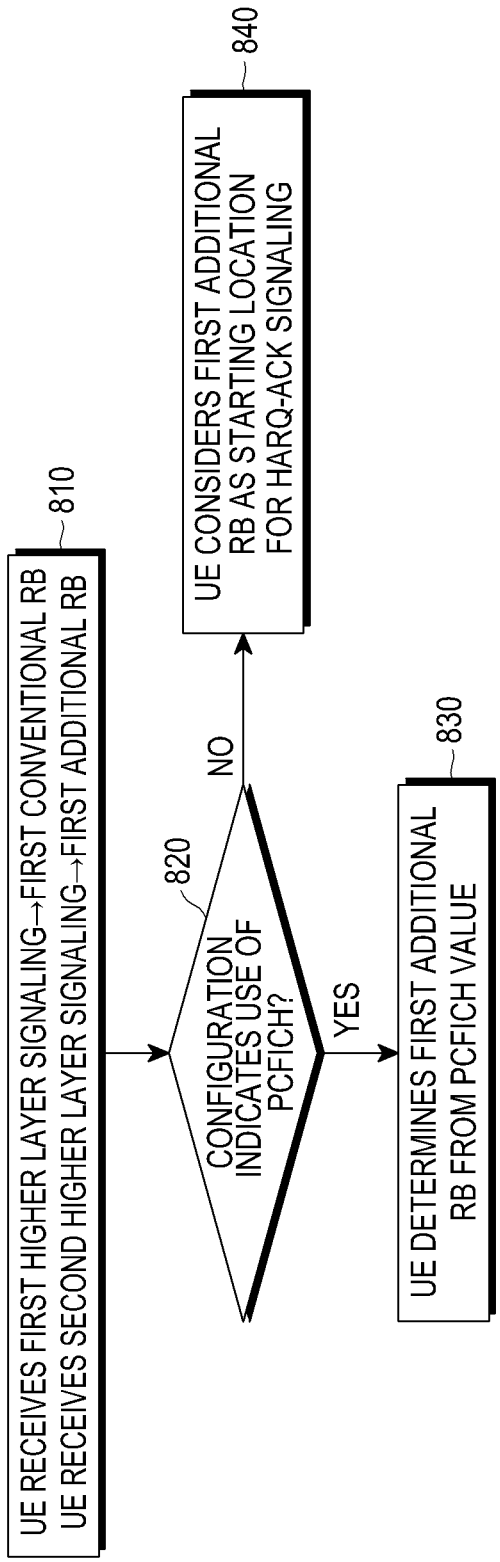
FIG. 8 is a diagram illustrating a process for a UE to determine a first non-conventional PUCCH resource for a HARQ-ACK signaling, according to an embodiment of the present invention.

FIG. 8 is a diagram illustrating a process for a UE to determine a first non-conventional PUCCH resource for a HARQ-ACK signaling.

Referring to FIG. 8, a UE configured for HARQ-ACK signaling in non-conventional PUCCH RBs, in addition to receiving a first higher layer signaling indicating $N_{PUCCH}$ a value for a resource in a first conventional PUCCH RB for HARQ-ACK signaling, it also receives a second higher layer signaling indicating a value for determining a first non-conventional resource in a PUCCH RB for HARQ-ACK signaling 810. The UE then examines whether it is configured to use a PCFICH to determine a first non-conventional PUCCH RB for HARQ-ACK signaling 820. If it is, a UE determines a first non-conventional PUCCH RB for HARQ-ACK signaling based on a value provided by a PCFICH 830 by determining a number of CCEs available for PDCCH transmissions and then determining respective PUCCH RBs for conventional HARQ-ACK signaling. A first non-conventional PUCCH RB for HARQ-ACK signaling is the first one after a conventional PUCCH RBs for HARQ-ACK signaling. If it is not, a UE determines a first non-conventional PUCCH RB being the one indicated by the second higher layer signaling 840.

A UE using a non-conventional PUCCH resource for HARQ-ACK signaling determines such resource $n_{PUCCH}^{COMP}$ as $n_{PUCCH}^{COMP} = f(n_{CCE}) + N_{PUCCH}^{COMP}$ where $f(n_{CCE})$ is a function of the PDCCH CCE(s) used to convey a DL SA in response to which a UE transmits a HARQ-ACK signal and $N_{PUCCH}^{COMP}$ is an offset informed to a UE by higher layer signaling.

For the first of the previously described approaches (CCEs of CSS are excluded from determining non-conventional PUCCH resources for HARQ-ACK signaling), $f(n_{CCE}) = n_{CCE} - N_{CCE}^{CSS}$. For the second of the previously described approaches (CCEs of CSS are not excluded from determining non-conventional PUCCH resources for HARQ-ACK signaling), $f(n_{CCE}) = \lceil N_{CCE}/N_{COMP} \rceil$. For the combination of the first and second approaches, $f(n_{CCE}) = \lceil (n_{CCE} - N_{CCE}^{CSS})/N_{COMP} \rceil$. If the conventioanl approach is used $f(n_{CCE}) = n_{CCE}$.

If a UE determines a first non-conventional resource for HARQ-ACK signaling from a PCFICH, then $N_{PUCCH}^{COMP} = \lceil (N_{CCE} + N_{PUCCH}) \cdot \Delta_{shift}^{PUCCH}/(N_{sc}^{RB} \cdot N_{oc}) \rceil$; otherwise, $N_{PUCCH}^{COMP}$ is the value configured by the aforementioned second higher layer signaling.

Figure 9:
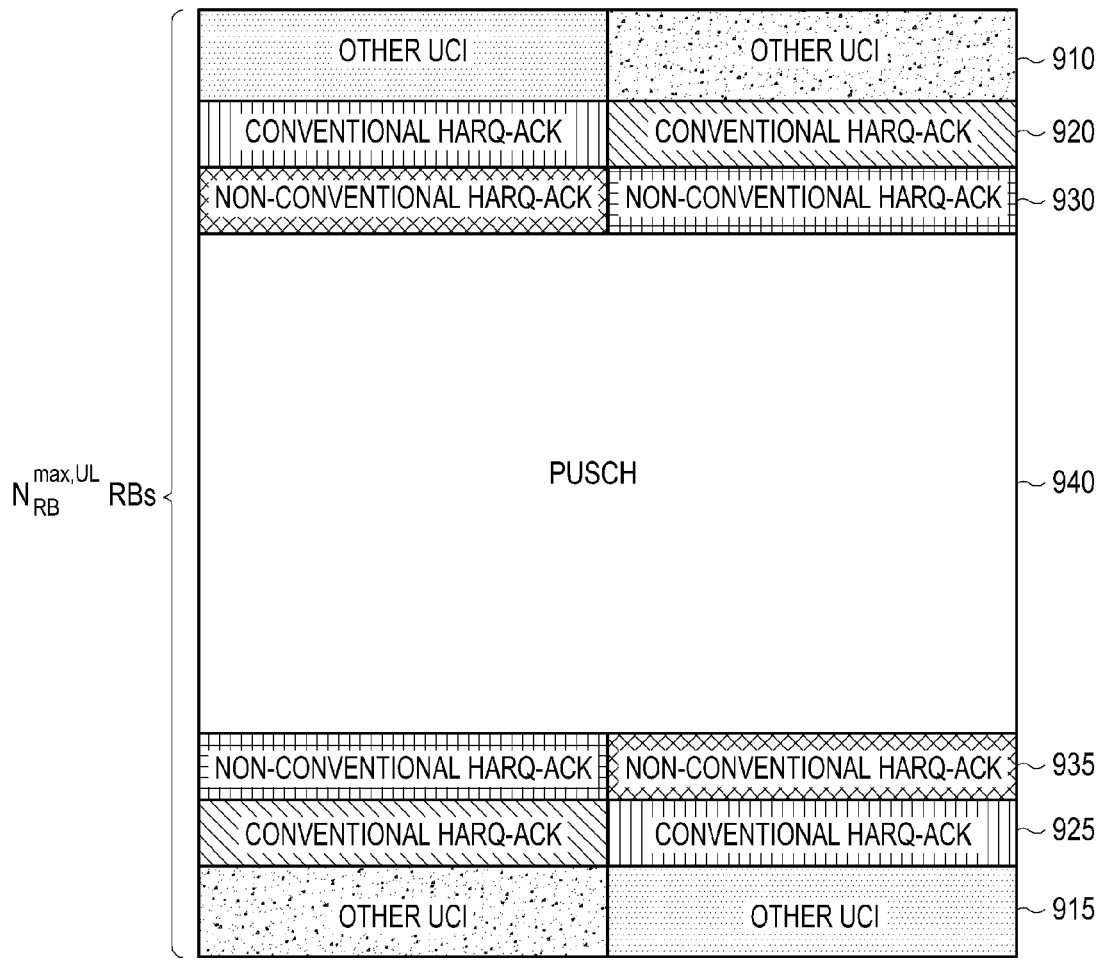
FIG. 9 is a diagram illustrating a placement of RBs for various types of UL resources in a UL BandWidth (BW), according to an embodiment of the present invention.

FIG. 9 is a diagram illustrating a placement of RBs for various types of UL resources in a UL BW.

Referring to FIG. 9, a UL BW includes RBs for conventional PUCCH resources for HARQ-ACK signaling 920 and 925, RBs for non-conventional PUCCH resources for HARQ-ACK signaling 930 and 935, RBs for PUCCH resources for other UCI signaling (may also include other HARQ-ACK signaling) 910 and 915, and PUSCH RBs for data/UCI signaling 940.

According to an aspect of the present invention, there is provided a design to dynamically indicate to a UE whether to use conventional PUCCH resources or non-conventional PUCCH resources for its HARQ-ACK signaling.

The need to indicate to a UE whether to use conventional PUCCH resources or non-conventional PUCCH resources for its HARQ-ACK signaling is motivated by an objective to minimize a non-conventional UL overhead associated with the latter resources. For example, when the number of UEs benefiting from orthogonal reception of their HARQ-ACK signals at a same set of multiple RPs in a subframe is small, respective non-conventional PUCCH resources are not used and instead assigned to PUSCHs. The reverse applies when a number of such UEs is large. Additionally, a UE may detect conventional PDCCH in some subframes and use a conventional PUCCH resource for a respective HARQ-ACK signal transmission while it detects a non-conventional PDCCH in other subframes and use a non-conventional PUCCH resource for a respective HARQ-ACK signal transmission. In general, there is a need to enable a network with the choice to assign non-conventional PUCCH resources to HARQ-ACK signaling depending on scheduling decisions in a respective subframe.

A first approach is to dynamically indicate to a UE whether to use a conventional PUCCH resource or a non-conventional PUCCH resource for its HARQ-ACK signaling by including a respective "PUCCH Resource Indication" field of 1 bit in a respective DL SA. Depending on a value of a "PUCCH Resource Indication" field, a UE may transmit its HARQ-ACK signal using a conventional PUCCH resource, for example when the field has a binary 0 value, or using a non-conventional PUCCH resource, for example when the field has a binary 1 value.

Figure 10:
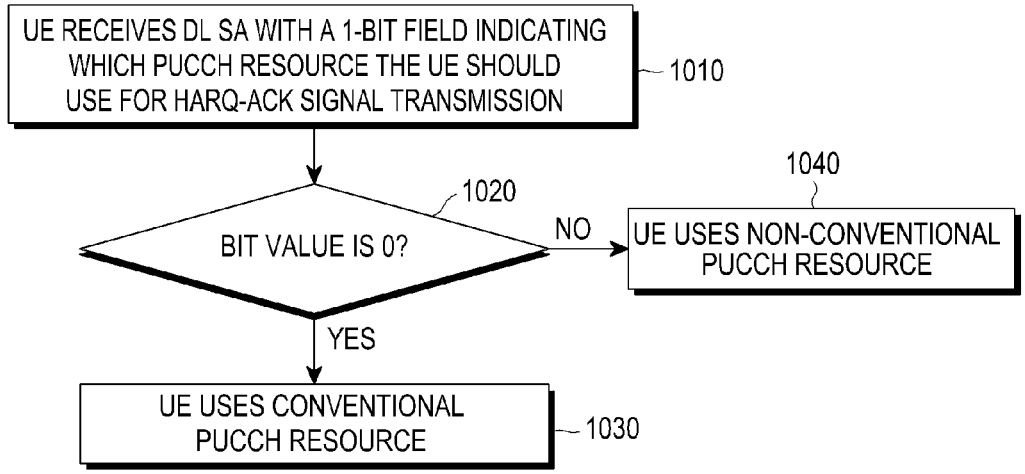
FIG. 10 is a diagram illustrating a process for a UE to determine a PUCCH resource for its HARQ-ACK signaling using a "PUCCH Resource Indication" field in a DL SA, according to an embodiment of the present invention.

FIG. 10 is a diagram illustrating a process for a UE to determine a PUCCH resource for its HARQ-ACK signaling using a "PUCCH Resource Indication" field in a DL SA.

Referring to FIG. 10, a DL SA includes a field including 1 bit 1010 and indicating whether a respective HARQ-ACK signal transmission should use a conventional or a non-conventional PUCCH resource. Based on a value of this field 1020, a UE transmits its HARQ-ACK signal in a conventional PUCCH resource for example when a value of the field is a binary '0' 1030, or in a non-conventional PUCCH resource for example when a value of the field is a binary '1' 1040.

A second approach is to link a PUCCH resource used by a UE for its HARQ-ACK signaling to a subframe a UE receives a respective DL SA. A UE is informed of this link by higher layer signaling of a subframe pattern. For example, for a frame duration of 10 subframes, a UE can be configured a pattern (bit-map) applicable in every frame and including 10 values of binary zeros or binary ones with a binary zero indicating that a UE should use a conventional PUCCH resource and a binary one indicating that a UE should use an non-conventional PUCCH resource for its HARQ-ACK signaling. A use of a conventional PUCCH resource is associated with a respective detected conventional PDCCH type and a use of a non-conventional PUCCH resource is associated with a respective detected non-conventional PDCCH type.

Compared to the first approach, the second approach does not change a size of a DL SA but restricts the flexibility of HARQ-ACK signaling to benefit from orthogonal reception at a same set of multiple RPs. Based on a tradeoff between non-conventional PUCCH overhead versus improved HARQ-ACK reception reliability, a scheduler can determine whether to transmit a DL SA to a UE in a subframe associated with non-conventional PUCCH resources or in a subframe associated with conventional PUCCH resources for HARQ-ACK signaling. For example, a scheduler may decide to positively bias a decision for transmission of DL SAs to respective UEs in former subframes and negatively bias such a decision in latter subframes.

Figure 11:
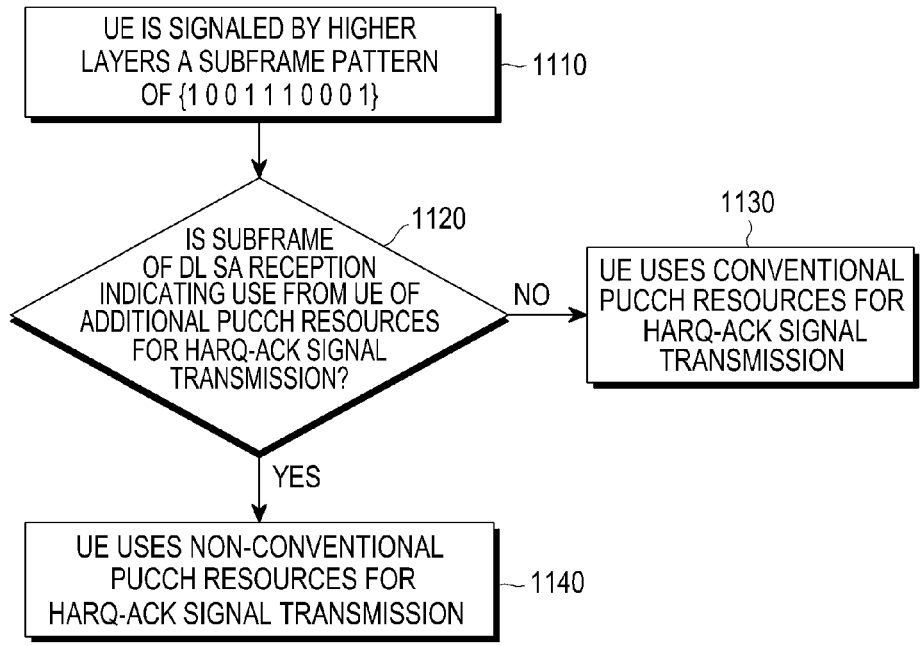
FIG. 11 is a diagram illustrating a process for a UE to determine a PUCCH resource for its HARQ-ACK signaling according to a subframe pattern signaled by higher layers, according to an embodiment of the present invention.

FIG. 11 is a diagram illustrating a process for a UE to determine a PUCCH resource for its HARQ-ACK signaling according to a subframe pattern signaled by higher layers.

Referring to FIG. 11, a UE is signaled by higher layers a subframe pattern for a determination of a conventional or a non-conventional PUCCH resource for its HARQ-ACK signaling 1110. For example, for a frame including 10 subframes a pattern (bit-map) that is applicable to every frame is {1 0 0 1 1 1 0 0 0 1} where a binary '0' indicates use of a conventional PUCCH resource (and a binary '1' indicates use of a non-conventional PUCCH resource. A UE examines whether a subframe of its DL SA reception is associated with a use of a conventional PUCCH resource or a use of a non-conventional PUCCH resource 1120 for a respective HARQ-ACK signal transmission. If the subframe pattern has a value of binary '0' for a subframe a UE receives a DL SA, a UE uses a conventional PUCCH resource for respective HARQ-ACK signaling 1130. If the subframe pattern has a value of binary '1' for a subframe a UE receives a DL SA, a UE uses a non-conventional PUCCH resource for respective HARQ-ACK signaling 1140. Further, although not illustrated in the drawings, a UE may also include a selector, a mapper, a transmitter, and a receiver. The selector selects a first resource in first resources, if the first sequence is used, wherein the first resource is determined from a sum of a lowest CCE index of the control channel and a first offset, and wherein the first resource is located between third resources used for transmissions of periodic control signals using one of the first sequence or the second sequence and second resources used for transmissions of dynamic control signals using the second sequence, or selects a second resource in second resources, if the second sequence is used, wherein the second resource is determined from a sum of the lowest CCE index of the control channel and a second offset, and wherein the third resources are located near each end of an operating bandwidth. The transmitter transmits the control signal in the first resource or in the second resource.

The mapper maps a sum of a lowest CCE index of the detected control channel and a first offset to a first resource, or maps a sum of a lowest index of a group of CCEs with consecutive indexes, containing a CCE with a lowest index of the detected control channel, and the second offset to a second resource. The transmitter configured to transmit the control signal in the first resource or in the second resource.

The receiver receives signaling of a bit-map with a size equal to a number of subframes in a frame. The mapper maps a bit in the bit-map to the subframe of the control channel detection. The transmitter configured to transmit the control signal in a first resource, if the bit has a first binary value or in a second resource, if the bit has a second binary value.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for a user equipment (UE) to transmit a control signal using a first sequence or a second sequence in response to a detected control channel, the method comprising:
   determining a first resource for the control signal transmission from a sum of a lowest control channel element (CCE) index of the detected control channel and a first offset, if the UE is not configured to use the second sequence through higher layer signaling;
   determining a second resource for the control signal transmission from a sum of the lowest CCE index of the detected control channel and a second offset, if the UE is configured to use the second sequence through the higher layer signaling; and
   transmitting the control signal in the first resource or in the second resource.

2. The method of claim 1, wherein the first sequence and the first offset are specific to a transmission point transmitting the detected control channel.

3. The method of claim 1, wherein the second sequence and the second offset are specific to the UE.

4. The method of claim 1, wherein the control signal conveys acknowledgement information associated with a reception of data transport blocks from the UE.

5. The method of claim 1, wherein the first sequence or the second sequence includes a Zadoff-Chu sequence.

6. A method for transmitting a control signal from a user equipment (UE) in a first resource or in a second resource in response to a detected control channel, the method comprising:
   determining the first resource from a sum of a lowest control channel element (CCE) index of the detected control channel and a first offset, or determining the second resource from a sum of the lowest CCE index of the detected control channel and a second offset;
   transmitting the control signal with a first sequence in the first resource, if the UE is not configured to use a second sequence through higher layer signaling; and transmitting the control signal with the second sequence in the second resource, if the UE is configured to use the second sequence through the higher layer signaling, wherein the first sequence is specific to a transmission point transmitting the detected control channel and the second sequence is specific to the UE apparatus.

7. The method of claim 6, wherein the first resource is determined, if the detected control channel is of a first type, and the second resource is determined, if the detected control channel is of a second type.

8. The method of claim 6, wherein the first offset is specific to a transmission point transmitting the detected control channel.

9. The method of claim 6, wherein the second offset is specific to the UE.

10. A user equipment (UE) apparatus configured to transmit a control signal using a first sequence or a second sequence in response to a detected control channel, the UE apparatus comprising:

a selector configured to select a first resource from first resources, if the UE apparatus is not configured to use the second sequence through higher layer signaling, wherein the first resource is determined from a sum of a lowest control channel element (CCE) index of the detected control channel and a first offset, and to select a second resource from second resources, if the UE apparatus is configured to use the second sequence through the higher layer signaling, wherein the second resource is determined from a sum of the lowest CCE index of the detected control channel and a second offset; and a transmitter configured to transmit the control signal in the first resource or in the second resource.

11. The UE apparatus of claim 10, wherein the first sequence and the first offset are specific to a transmission point transmitting the detected control channel.

12. The UE apparatus of claim 10, wherein the second sequence and the second offset are specific to the UE apparatus.

13. The UE apparatus of claim 10, wherein the control signal conveys acknowledgement information associated with a reception of data transport blocks from the UE apparatus.

14. The UE apparatus of claim 10, wherein the first sequence or the second sequence is a Zadoff-Chu sequence.

15. A user equipment (UE) apparatus configured to transmit a control signal in a first resource or in a second resource in response to a detected control channel, the UE apparatus comprising:

a mapper configured to map a sum of a lowest control channel element (CCE) index of the detected control channel and a first offset to the first resource, or to map a sum of the lowest CCE index of the detected control channel and a second offset to the second resource; and a transmitter configured to transmit the control signal with a first sequence in the first resource, if the UE apparatus is not configured to use a second sequence through higher layer signaling, and to transmit the control signal with the second sequence in the second resource, if the UE apparatus is configured to use the second sequence through the higher layer signaling, wherein the first sequence is specific to a transmission point transmitting the detected control channel and the second sequence is specific to the UE apparatus.

16. The UE apparatus of claim 15, wherein the first resource is used, if the detected control channel is of a first type, and the second resource is used, if the detected control channel is of a second type.

17. The UE apparatus of claim 15, wherein the first offset is specific to a transmission point transmitting the detected control channel.

18. The UE apparatus of claim 15, wherein the second offset is specific to the UE.

\* \* \* \* \*